United States Patent
Radomski et al.

(10) Patent No.: US 9,879,545 B2
(45) Date of Patent: Jan. 30, 2018

(54) MANUFACTURE OF HOLLOW AEROFOIL

(71) Applicant: ROLLS-ROYCE PLC, London (GB)

(72) Inventors: Steven Aleksy Radomski, Nottingham (GB); Clive Grafton-Reed, Leicestershire (GB); Ian Crowston, Manchester (GB); Andrea Lelio Maurizio, Maniago (IT)

(73) Assignee: ROLLS-ROYCE plc, London (GB)

( * ) Notice: Subject to any disclaimer, the term of this patent is extended or adjusted under 35 U.S.C. 154(b) by 711 days.

(21) Appl. No.: 14/158,014

(22) Filed: Jan. 17, 2014

(65) Prior Publication Data

US 2014/0271227 A1    Sep. 18, 2014

(30) Foreign Application Priority Data

Feb. 8, 2013  (GB) .................................. 1302262.9
Sep. 20, 2013 (GB) .................................. 1316730.9

(51) Int. Cl.
*F01D 5/18* (2006.01)
*B23P 15/04* (2006.01)
*F01D 5/14* (2006.01)

(52) U.S. Cl.
CPC ............... *F01D 5/18* (2013.01); *B23P 15/04* (2013.01); *F01D 5/147* (2013.01); *Y02T 50/672* (2013.01); *Y10T 29/49339* (2015.01)

(58) Field of Classification Search
CPC . F01D 5/18; F01D 5/147; B23P 15/04; Y02T 50/672; Y10T 29/49339
USPC ............... 416/229 A, 232; 29/889.7, 889.71, 29/889.72, 889.721
See application file for complete search history.

(56) References Cited

U.S. PATENT DOCUMENTS

| | | | | |
|---|---|---|---|---|
| 1,762,352 A | * | 6/1930 | Ray ..................... | F01D 5/147 29/889.72 |
| 2,807,437 A | * | 9/1957 | Roush ..................... | B22F 5/10 228/159 |
| 3,606,580 A | * | 9/1971 | Kaufman ................. | B21H 7/16 416/232 |

(Continued)

FOREIGN PATENT DOCUMENTS

| | | |
|---|---|---|
| EP | 1 462 609 A1 | 9/2004 |
| EP | 1 596 036 A1 | 11/2005 |

(Continued)

OTHER PUBLICATIONS

Search Report issued in European Patent Application No. 14 15 1381 dated Jun. 5, 2014.

(Continued)

*Primary Examiner* — Hoang Nguyen
(74) *Attorney, Agent, or Firm* — Oliff PLC

(57) ABSTRACT

A method of manufacturing a hollow aerofoil component for a gas turbine engine includes using a capping panel to cover a pocket in a pocketed aerofoil body. During manufacture, the outer surface of the capping panel is located relative to the pocketed aerofoil body. This ensures that the outer surface of the capping panel is located as accurately as possible. This means that the capping panel can be made to be as thin as possible, which in turn reduces weight and material wastage. Once the capping panel has been located in position, it may be welded to the aerofoil body in order to produce the hollow aerofoil component.

13 Claims, 6 Drawing Sheets

(56) References Cited

U.S. PATENT DOCUMENTS

| | | | | |
|---|---|---|---|---|
| 5,041,182 A * | 8/1991 | Sekiguchi | ............ | B29C 70/345 |
| | | | | 156/245 |
| 5,104,033 A * | 4/1992 | Tanaka | ................. | B23K 37/047 |
| | | | | 228/12 |
| 7,021,899 B2 * | 4/2006 | Ferte | .................... | B23K 20/122 |
| | | | | 29/889.72 |
| 7,980,817 B2 * | 7/2011 | Foose | ..................... | F01D 5/147 |
| | | | | 415/191 |
| 8,616,834 B2 * | 12/2013 | Knight, III | ................ | F01D 5/18 |
| | | | | 415/116 |

FOREIGN PATENT DOCUMENTS

| | | |
|---|---|---|
| EP | 1 983 160 A2 | 10/2008 |
| EP | 2 362 066 A2 | 8/2011 |
| EP | 2 727 681 A1 | 5/2014 |
| GB | 2 236 270 A | 4/1991 |
| JP | A-2006-316790 | 11/2006 |
| WO | WO 2013/011235 A1 | 1/2013 |

OTHER PUBLICATIONS

May 20, 2013 Search Report issued in United Kingdom Patent Application No. GB1302262.9.
Partial Search Report issued in European Application No. 14151381 dated Mar. 28, 2014.

* cited by examiner

MANUFACTURE OF HOLLOW AEROFOIL

CROSS-REFERENCE TO RELATED APPLICATIONS

This application is based upon and claims the benefit of priority from British Patent Application Numbers GB 1302262.9 filed 8 Feb. 2013 and GB 1316730.9 filed 20 Sep. 2013, the entire contents of which are incorporated by reference.

BACKGROUND OF THE INVENTION

1. Field of the Invention

The present invention relates to the manufacture of a hollow aerofoil, in particular the manufacture of a hollow aerofoil component for use in a gas turbine engine.

Aerofoil shaped components are used throughout gas turbine engines. For example, aerofoil shaped stator vanes and rotor blades are used to guide gas through the engine, for example both in the turbine and the compressor, including the fan and associated guide vanes.

2. Description of the Related Art

Weight reduction is an important consideration in gas turbine engines, particularly, although not exclusively, for gas turbine engines used to power aircraft. Generally, the lower the weight of the component the better the performance of the aircraft to which it is fitted, for example in terms of fuel consumption. To this end, it is known to use hollow aerofoils, e.g. rotor blades and/or stator vanes, in some stages of gas turbine engines.

One method of producing a hollow aerofoil involves forming the structure using a skin. This involves creating an internal cavity (which may be filled with another, lighter weight, material) using hot creep or super plastic forming processes. Such processes may generate aerofoils with some advantageous properties, such as thin skin thickness and tight dimensional tolerance, but they involve significant material wastage. This material wastage makes these processes expensive, due at least to high material cost for a given size of hollow aerofoil component.

An alternative method or producing hollow aerofoil components involves attaching a plate to an aerofoil structure out of which a pocket has been machined. The plate is placed into the pocket and attached (for example welded or bonded) therein to produce a hollow aerofoil component.

An advantage of producing the hollow aerofoil by using a plate to cover a pocket in an aerofoil structure is that there is less material wastage than using a skin to produce the hollow aerofoil. However, the dimensional tolerances are not so accurate. This may be because distortion is introduced in the process of attaching the plate to the pocketed aerofoil. Additionally, tolerance errors may "stack-up" in the process used to produce the pocketed aerofoil, the process used to produce the plate, and the process/feature used to locate the plate into position in the pocket, which typically involve placing the plate onto a supporting ledge inside the pocket.

The lack of dimensional accuracy means that the plate generally has to be manufactured to be thicker than would otherwise be required. For example, the extra thickness may be required in order to ensure that there is enough material to be machined back to produce the desired aerofoil shape after it has been fixed into the pocket. Without the extra thickness, the dimensional variation resulting from tolerance "stack-up" and/or distortion may mean that there is not sufficient material to produce the desired aerofoil shape in some of the aerofoils produced by the method.

However, this extra thickness means both that the component is heavier than it would otherwise need to be, and also that there is more material wastage.

It is therefore desirable to manufacture hollow aerofoil components by using a plate to cover a pocket (so as to take advantage of the generally lower material wastage), but with improved dimensional tolerance.

OBJECTS AND SUMMARY OF THE INVENTION

According to an aspect, there is provided a method of manufacturing a hollow aerofoil (or hollow aerofoil component) using a capping panel and a pocketed aerofoil body. The capping panel has an inner surface and an opposing outer surface. The pocketed aerofoil body has an open pocket formed in a surrounding hollowed surface. The method comprises locating (and/or holding) the capping panel in a capping position relative to the pocketed aerofoil body, such that the inner surface faces into the pocket and the outer surface faces away from the pocket; and joining (for example permanently and/or irreversibly joining, for example welding) the capping panel to the pocketed aerofoil body so that the capping panel closes the pocket to form a cavity. The step of locating the capping panel in the capping position comprises positioning the outer surface of the capping panel relative to the surrounding hollowed surface of the pocketed aerofoil body.

Accordingly, the pocketed aerofoil body may be said to be positioned relative to (or have its position determined relative to) the outer surface of the capping panel when the capping panel is in the capping position. Thus, for example, the position of the capping panel relative to the pocketed aerofoil body when in the capping position may be said to be determined by the outer surface of the capping panel and/or by the surrounding hollowed surface of the pocketed aerofoil body. The step of locating the capping panel in the capping position may be said to comprise positioning the outer surface of the capping panel in a predetermined position relative to the pocketed aerofoil body, for example relative to the surrounding hollowed surface of the pocketed aerofoil body.

For example, the step of locating the capping panel in the capping position may be said to comprise positioning the capping panel (for example the outer surface of the capping panel) with reference to (for example with direct reference to) the surrounding hollowed surface of the pocketed aerofoil body. The step of locating the capping panel in the capping position may be said to comprise positioning the capping panel (for example the outer surface of the capping panel) using (or directly using) the surrounding hollowed surface of the aerofoil body. The step of locating the capping panel in the capping position may be said to comprise positioning the capping panel (for example the outer surface of the capping panel) relative to (for example directly relative to) the surrounding hollowed surface of the pocketed aerofoil body.

Locating the outer surface of the capping panel relative to the surrounding hollowed surface of the pocketed aerofoil body means that the capping panel, for example the outer surface of the capping panel, can be located very accurately, for example relative to the hollowed surface. This may mean that the capping panel can be made thinner than with conventional methods, because the amount of additional thickness required to allow for the variation in position of the outer surface of the capping panel due to tolerance errors is reduced/minimized.

The thinner panel results in reduced weight, reduced material costs and a reduction in the amount of machining that is required after joining to produce the desired aerofoil surface. Furthermore, using a thinner panel means that, where welding is used in the joining process, the amount of input power can be reduced. In turn, this means that the amount of distortion produced in the welding process may be reduced, resulting in a more accurate profile post-welding that may require less machining to produce the finished aerofoil surface.

The surrounding hollowed surface, which may be referred to as the external surface of the pocketed aerofoil body in which the pocket is formed, may, for example, be either a pressure surface or a suction surface of an aerofoil.

According to an aspect, there is provided a method of manufacturing a hollow aerofoil using a capping panel and a pocketed aerofoil body, the capping panel having an inner surface and an opposing outer surface, and the pocketed aerofoil body having an open pocket formed in a surrounding hollowed surface. The method comprises forming the capping panel such that it comprises a support tab extending around at least a part of its perimeter. The method comprises locating the capping panel in a capping position relative to the pocketed aerofoil body, such that the support tab engages the surrounding hollowed surface of the pocketed aerofoil body. The method comprises joining the capping panel to the pocketed aerofoil body so that the capping panel closes the pocket to form a cavity.

The step of forming the capping panel may comprise machining a recess into the capping panel so as to form an engaging face.

The step of locating the capping panel in the capping position may comprise engaging the engaging face with the surrounding hollowed surface.

The invention may comprise any one, or to the extent that they are compatible any combination, of the following features.

The method may further comprise holding the capping panel in the capping position using the outer surface. For example, the force and/or apparatus required to hold the capping panel in the capping position may be applied to the outer surface of the capping panel. In this way, the capping panel may be located and/or held in the capping position without contacting/supporting the inner surface of the capping panel.

After the welding step, the outer surface of the capping panel may be continuous with the hollowed surface of the pocketed aerofoil body. The capping panel, along with the hollowed surface, may form part of the gas-washed surface of the manufactured hollow aerofoil, for example a part of the suction or the pressure surface. A finishing step (for example machining) may be used after the joining step to produce the finished gas-washed surface. Because the outer surface of the capping panel is located in position relative to the hollowed surface, their relative position can be controlled accurately, and so any subsequent finishing/machining required should be minimized and/or accurately repeatable between specimens.

Any suitable method and/or apparatus may be used to hold the capping panel, for example to locate the capping panel in the capping position and/or hold the capping panel in the capping position. For example, suction may be applied on/to the outer surface to hold the capping panel. Suction may be applied before the joining step is completed, which may include during locating the capping panel in the capping position and/or during the joining process itself. Thus, for example, suction may be used during the step of locating the capping panel in the capping position and/or to hold the capping panel in the capping position, for example during the joining step.

Suction may be applied to the outer surface of the capping panel by reducing the pressure over at least a part of the outer surface. Thus, the pressure over at least a part of the outer surface may be lower than the pressure over the inner surface and/or the average pressure over the outer surface may be less than the average pressure over the inner surface. Thus, suction, for example a vacuum or a partial vacuum, may be applied to the outer surface of the capping panel in order to hold it for locating into the capping position and/or holding in the capping position for joining.

In any arrangement, the capping panel may comprise at least one support tab. The support tab may extend from the outer surface of the capping panel. The capping panel may be located and/or held in the capping position by resting the or each at least one support tab on the hollowed surface of the pocketed aerofoil body.

Thus, positioning the capping panel (for example the outer surface of the capping panel) relative to the surrounding hollowed surface of the pocketed aerofoil body may comprise engaging (or resting, or supporting) a part of the capping panel (in the form of a support tab) on the surrounding hollowed surface of the pocketed aerofoil body.

A single support tab may be provided that may extend around all, or substantially all, of the capping panel. Alternatively, more than one support tab may be provided.

The support tab may be referred to as a ledge, a mounting ledge or a locating ledge, for example. Alternatively, the support tab may be referred to as an extension, a mounting extension, or a locating extension, of the capping panel for example.

The support tab could be formed, for example, as a separate element that is joined to the rest of the capping panel (for example by welding) prior to being located in the capping position.

Alternatively, the support tab may be formed from the same part (for example from the same sheet, which may be a shaped metal sheet) as the rest of the capping panel. Purely by way of example, the support tab may be formed by appropriate stamping or pressing of a panel so as to form the or each support tab with the rest of the capping panel. By way of further non-limitative example, the support tab may be formed as part of the original shape of the capping panel, for example by hot forming, forging, or casting the capping panel. Of course, other techniques for forming a support tab in the capping panel will be readily apparent to the skilled person.

A combination of using support tabs and using suction may be used to hold the capping panel.

The capping panel may be aligned and fixed in a capping fixture. The outer surface of the capping panel may be aligned and fixed in the capping fixture. For example, an alignment marker may be provided in the capping fixture, which may be aligned with a corresponding alignment marker or feature on the capping panel in order to align the capping panel in the capping fixture. The capping fixture may be used to locate and/or hold the capping panel in the capping position.

The capping fixture may be used, for example, to apply suction to the outer surface of the capping panel in order to hold the capping panel.

According to such an arrangement, the capping fixture may be moved relative to the pocketed aerofoil body so as to locate the capping panel in the capping position. This may be a particularly convenient way to locate (and optionally subsequently hold) the capping panel relative to the hollowed surface of the aerofoil into the capping position.

The pocketed aerofoil body may be aligned and fixed in a body fixture. For example, an alignment marker may be provided in the body fixture, which may be aligned with a corresponding alignment marker or feature on the pocketed aerofoil body in order to align the pocketed aerofoil body in the body fixture.

The body fixture may have a reference marker. Where a capping fixture is used, it too may have a reference marker. According to such an arrangement, in order to locate the capping panel in the capping position, the body fixture and the capping fixture may be moved relative to each other until their respective reference markers are aligned.

The joining step may comprise any suitable joining process, for example any fusion joining process, for example welding. Such welding may comprise any suitable form of welding, for example fusion welding. By way of example, the welding step may comprise the use of a welding beam, such as laser welding or electron beam welding, TIG welding, or MIG welding. By way of further example, a friction stir welding process may be used in the joining step.

Where a welding beam is used, the welding beam may be inclined at an angle relative to the perpendicular to the surface being welded. The welding beam may be directed away from the pocket and into the material forming the pocketed aerofoil body, i.e. into the bulk structure of the pocketed aerofoil body. In this way, the amount of material ejected, or spattered, from the weld area during welding may be reduced, and/or substantially eliminated. Additionally or alternatively, angling the welding beam may ensure that the welding beam does not impinge, and thus potentially damage, an opposing surface of the pocket after it has passed through the weld region.

The pocketed aerofoil body may comprise an anti-spatter feature in the pocket. This may reduce (for example substantially eliminate) spatter caused by a welding process, for example by blocking the region immediately behind the weld.

The anti-spatter feature may comprise a ledge located inside the pocket. The ledge may be positioned such that, when the capping panel is in the capping position, the ledge faces the inner surface of the capping panel. There may be a gap between the ledge and the capping panel. Leaving a gap between the ledge and the inner surface of the capping panel may help to ensure that the capping panel can be located in the capping position by positioning the outer surface of the capping panel relative to the pocketed aerofoil body (for example relative to the surrounding hollowed surface thereof), rather than the position of the outer surface of the capping panel being determined at least in part by the position of the ledge.

The anti-spatter feature, such as a ledge, may be any suitable shape. For example, the ledge may be a protrusion that extends around the inside of the pocket at a distance below (that is to say offset from) the hollowed surface, that distance preferably being greater than the thickness of the capping panel. The ledge may be, for example, a straight ledge (i.e. substantially parallel to or at an angle to the inner surface of the capping panel), or a shaped ledge, for example forming a trough that extends around the pocket.

The method of manufacturing a hollowed aerofoil may further comprise providing the pocketed aerofoil body. The method of manufacturing a hollowed aerofoil may further comprise machining the pocket into an aerofoil blank in order to produce the pocketed aerofoil body cavity.

According to an aspect of the invention, there is also provided an aerofoil (or aerofoil component) manufactured according to any of the methods described herein in relation to the invention. The aerofoil may be, for example, a stator vane or a rotor blade of a gas turbine engine, for example an outlet guide vane that extends across a bypass duct of a turbofan gas turbine engine.

According to the invention, there is also provided a gas turbine engine comprising an aerofoil (or aerofoil component) manufactured according to any of the methods described herein in relation to the invention.

BRIEF DESCRIPTION OF THE DRAWINGS

Embodiments of the invention will now be described by way of example only, with reference to the accompanying diagrammatic drawings, in which.

DETAILED DESCRIPTION OF THE PREFERRED EMBODIMENTS

Figure 1:
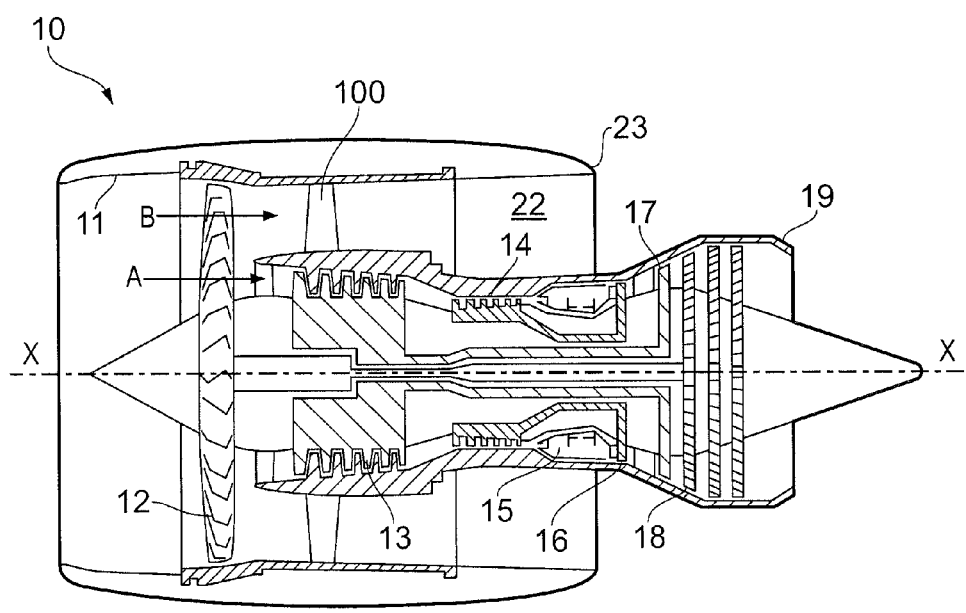
FIG. 1 is a sectional side view of a gas turbine engine.

With reference to FIG. 1, a ducted fan gas turbine engine generally indicated at 10 has a principal and rotational axis X-X. The direction X-X may be referred to as the axial direction of the engine. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B (which may be referred to as a bypass flow B) which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

As the air passes through the gas turbine engine 10 it is heated to high temperatures. In particular, the first airflow A reaches high temperatures as it passes through the core of the engine. Typically, particularly high temperatures may be reached at the exit of the combustion equipment 15, and as the air subsequently passes through the high, intermediate and low-pressure turbines 16, 17, 18.

The gas turbine engine 10 comprises outlet guide vanes (OGVs) 100 extending across the bypass duct 22, which therefore sit in the bypass flow B. Each OGV 100 takes the form of a large stator vane, and thus may be referred to as an aerofoil or aerofoil component 100. A plurality of OGVs 100 is typically provided as an annular array in the bypass duct 22.

Because each OGV 100 is an especially large aerofoil component, it is particularly advantageous to reduce its weight. Thus, the OGV 100 in the gas turbine engine 10 is hollow.

Figure 2:
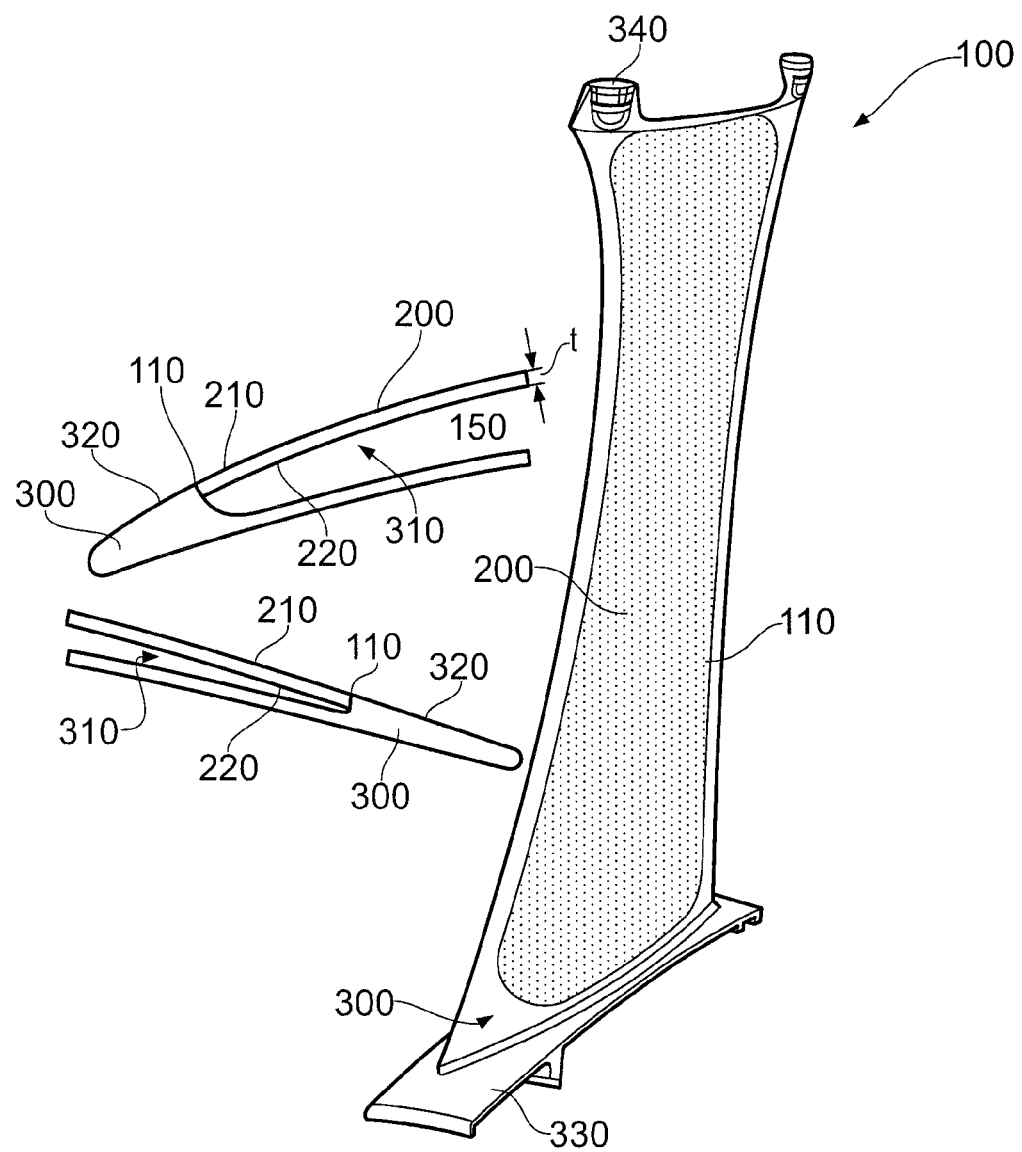
FIG. 2 is a schematic showing a hollow aerofoil in accordance with the invention.

FIG. 2 shows a schematic of a hollow OGV 100 according to an example of the invention. As illustrated in FIG. 2, the hollow OGV 100 is manufactured by joining a capping panel 200 to a pocketed aerofoil body 300. In the FIG. 2 example, the capping panel 200 is joined to the pocketed aerofoil body 300 by welding along a weld line 110.

FIG. 2 shows the capping panel 200 and the pocketed aerofoil body 300 welded together to form a hollow OGV 100 having a cavity 150 (which may or may not be filled). However, it will be appreciated that prior to joining, the capping panel 200 and the pocketed aerofoil body 300 are separate entities. The capping panel 200 and the pocketed aerofoil body 300 may be any suitable material, for example metallic and/or composite, and may be the same or different materials.

The pocketed aerofoil body 300 comprises a pocket 310, which may be described as an open pocket 310, formed in a surrounding hollowed surface 320. For example, the pocket 310 may be machined into an original surface of an aerofoil blank, leaving a portion of the original surface of the aerofoil blank, referred to as the surrounding hollowed surface 320, surrounding the pocket 310. The original aerofoil blank may be, for example, a close-to-size forging. The surrounding hollowed surface 320 may be a part of the gas washed surface of the finished OGV 100, for example a part of the pressure surface or the suction surface, as in the examples shown in the Figures. The surrounding hollowed surface 320 may require finishing to become a part of the gas washed surface of the finished OGV 100.

In the example shown in FIG. 2, the pocketed aerofoil body 300 comprises an inner attachment 330 (which may be a platform) and an outer attachment 340, which may be used to attach the finished OGV 100 to the rest of the gas turbine engine. However, it will be appreciated that some pocketed aerofoil bodies 300 may not include one or both of the inner attachment 330 and outer attachment 340. For example, the inner and/or outer attachments 330/340 may be separate features that may be attached to the hollow aerofoil 100 after the capping panel 200 and the pocketed aerofoil body 300 have been joined together.

The capping panel 200 comprises an inner surface 220 that faces into the pocket 310, and an outer surface 210 that faces in the opposite direction to the inner surface 220, i.e. the outer surface faces away from the pocket 310. The capping panel 200 may be said to be a thin body, having an inner surface 220 separated from an outer surface 210 by a thickness t. The outer surface 210 may form a part of the gas washed surface of the finished OGV 100, for example after a finishing step. For example, the outer surface 210 may form a part of the pressure surface, or the suction surface as in the example shown in the Figures. After joining the pocketed aerofoil body 300 and the capping panel 200 (and optionally applying a finished step to the resulting hollow aerofoil component), the outer surface 210 may be a continuation of the surrounding hollowed surface 320 of the pocketed aerofoil body 300.

During manufacture, the capping panel 200 and pocketed aerofoil body must be brought together and located in the correct position (which may be referred to as a capping position). In general terms, this is achieved by positioning, or aligning, the pocketed aerofoil body 300 relative to the outer surface 210 of the capping panel 200. This may ensure that the capping panel 200, for example the outer surface 210 of the capping panel 200, is positioned relative to the pocketed aerofoil body 300, for example the surrounding hollowed surface 320 of the pocketed aerofoil body 300, as accurately as possible. In turn, this allows the thickness t of the capping panel to be minimized, thereby reducing weight, material costs and post-joining machining time/costs.

Figure 3:
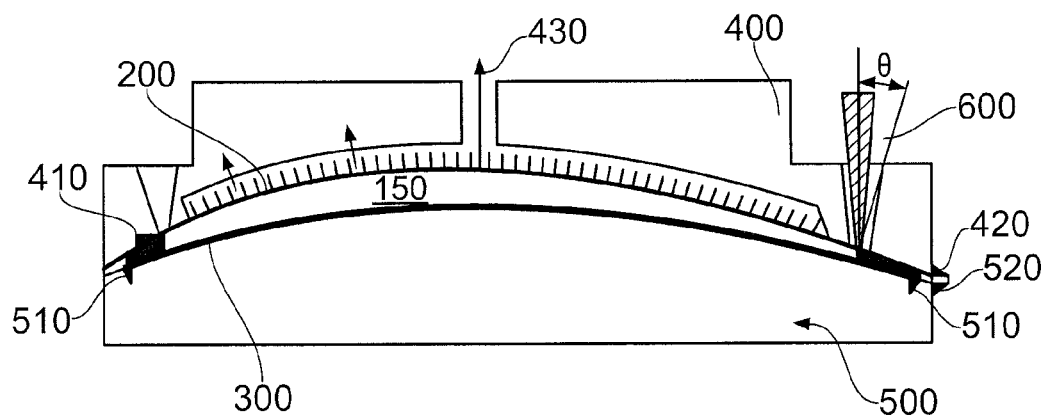
FIG. 3 is a schematic cross-section through a capping panel and a pocketed aerofoil body in respective fixtures during manufacture of a hollow aerofoil.

An example of one method for locating the capping panel 200 relative to the pocketed aerofoil body 300 is show in FIG. 3. The pocketed aerofoil body 300 may be aligned and fixed into a fixture 500 (which may be referred to as a body fixture 500), as shown in FIG. 3. The body fixture 500 may comprise an alignment marker 510, which may be, for example, a visual marker or a physical notch, in order to correctly locate the pocketed aerofoil body 300 in the body fixture 500.

The capping panel 200 may be aligned and fixed into a fixture 400 (which may be referred to as a capping fixture 400), also as shown in FIG. 3. The capping fixture 400 may comprise an alignment marker 410, which may be, for example, a visual marker or a physical notch, in order to correctly locate the capping panel 200 in the capping fixture 400.

The capping fixture 400 may align and hold the capping panel 200 using the outer surface 210, as in the FIG. 3 example. In FIG. 3, suction 430 is applied to the outer surface 210 of the capping panel 200 through (or using) the capping fixture 400.

Once the capping panel 200 is aligned and fixed in the capping fixture 400 and the pocketed aerofoil body 300 is aligned and fixed in the body fixture 500, the capping fixture 400 and the body fixture 500 may themselves be aligned, for example by being moved relative to each other. One of the capping fixture 400 and the body fixture 500 may be a fixed fixture, and the other may be a moveable fixture. For example, the capping fixture 400 may be moved relative to the body fixture 500 until respective reference markers 420, 520 are aligned, or fixed together. The capping panel 200 may thereby be located in the capping position.

Once the capping panel 200 has been located in the capping position, it may be joined to the pocketed aerofoil body 300, for example by welding. A welding beam 600 may be used to join the capping panel 200 to the pocketed aerofoil body 300, as in the example shown in FIG. 3. The welding beam 600 may be, by way of example only, a laser beam or an electron beam. The beam 600 may be aligned to the perpendicular to the local surfaces 210, 320 being welded. Alternatively, and as shown in the FIG. 3 example, the welding beam 600 may be inclined at an angle θ to the perpendicular, so as to point towards the body (i.e. away from the pocket 310) of the pocketed aerofoil body 300. This may reduce the amount of spatter that is deposited in the pocket 310/cavity 150 as a result of the welding process. Alternatively, the welding beam 600 may be inclined at an angle θ to the perpendicular, so as to point away from the body (i.e. into the pocket 310).

The angle θ of the welding beam 600 to the perpendicular may be any suitable angle depending on, for example the required power level of the beam, the geometry of the pocketed aerofoil body (including any anti-spatter feature) and/or the level of back-reflection that the welding equipment is able to tolerate. For example, the angle θ of the welding beam to the perpendicular may be +/−30 degrees, for example +/−25 degrees, for example +/−20 degrees, for example +/−15 degrees, for example +/−10 degrees, for example +/−5 degrees, for example between 0 degrees and +/−5 degrees. The welding beam 600 could be angled in any suitable direction relative to the perpendicular, for example towards the spanwise direction, the chordwise direction, or any combination thereof.

Figure 4:
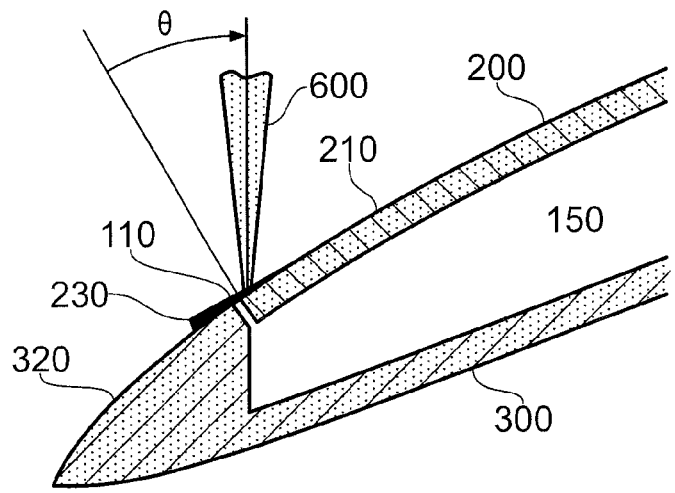
FIG. 4 is a schematic cross-section showing a weld beam that may be used to join the capping panel to the pocketed aerofoil body.

The angle θ of the beam 600 is shown more clearly in FIG. 4. In FIG. 4, the cover plate 200 abuts the pocketed aerofoil body 300 (at the weld line 110) in a direction perpendicular to the outer surface 210 and surrounding hollowed surface 320. However, it will be appreciated that this need not be the case, and the cover plate 200 may abut the pocketed aerofoil body 300 at other angles.

FIG. 4 also illustrates an alternative exemplary technique for locating the capping panel 200 in the capping position, through the use of support tabs 230. The support tab 230, of known dimensions, may extend from the outer surface 210 of the capping panel 200 and locate, or rest, on the surrounding hollowed surface 320 of the pocketed aerofoil body 300. In this way, the outer surface 210 can be accurately located relative to the pocketed aerofoil body 300. At least one such support tab 230 may be provided around the capping panel 200. For example, the support tab 230 may be a single support tab that extends around all, or substantially all, of the capping panel. Alternatively, the support tab 230 may be one of at least two support tabs. The support tabs 230 may be broken off during the joining (e.g. welding) step, removed after the joining step, or machined off in a finishing operation.

The or each support tab 230 may be formed in any desired manner. For example, the support tab 230 could be formed as a separate element that is joined to the rest of the capping panel 200 (for example by welding) prior to being located in the capping position.

Alternatively, the support tab 230 may be formed from the same part (for example from the same sheet, which may be a shaped metal sheet) as the rest of the capping panel 200. Purely by way of example, the support tab may be formed by appropriate stamping or pressing a panel so as to form the or each support tab with the rest of the capping panel 200. By way of further non-limitative example, the or each support tab 230 may be formed as part of the original shape of the capping panel 200, for example by hot forming, forging, or casting the capping panel 200. Of course, other techniques and/or methods for forming a support tab 230 in the capping panel 200 will be readily apparent to the skilled person, such as machining a support tab 230 into a capping panel 200.

Figure 11A:
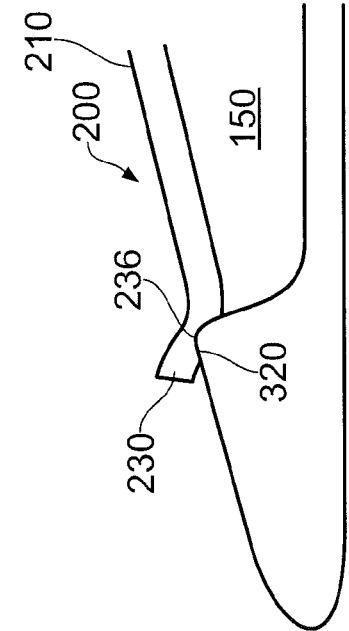
FIGS. 11*a* to 11*d* show various stages in a capping panel being joined to a pocketed aerofoil body.

FIGS. 11a to 11d show an example of such a capping panel 200 comprising a support tab 230 being joined to a pocketed aerofoil body 300. FIG. 11a illustrates how the capping panel 200 with the support tab 230 is formed. In this case, the capping panel 200 is initially formed having an edge or perimeter portion bent in a direction away from the pocketed aerofoil body onto which it is to be placed. A recess 234 is then machined into the capping panel 200 to complete the formation of the support tab 230, i.e. in FIG. 11a the hashed area labelled 234 is removed, for example by machining.

Figure 11B:
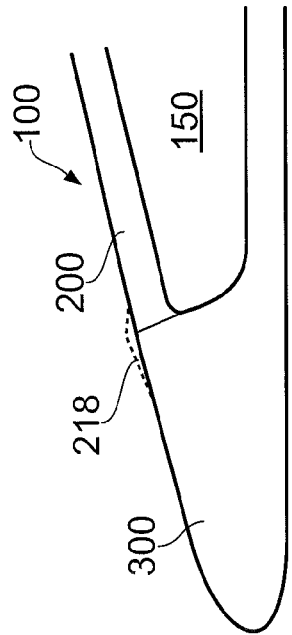

As shown in FIG. 11b, the pocketed aerofoil body 300 and the capping panel 200 with support tab 230 are then moved together such that an engaging portion (or face) 236 on the support tab 230 engages with the surrounding hollowed surface 320 of the pocketed aerofoil body 300. In this way, the capping panel 230 is located in the capping position, with the outer surface 210 of the capping panel 200 in position relative to the surrounding hollowed surface 320 of the pocketed aerofoil body 300.

Figure 11C:
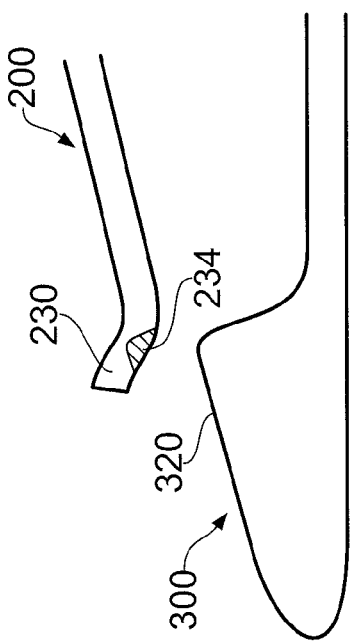
Figure 11D:
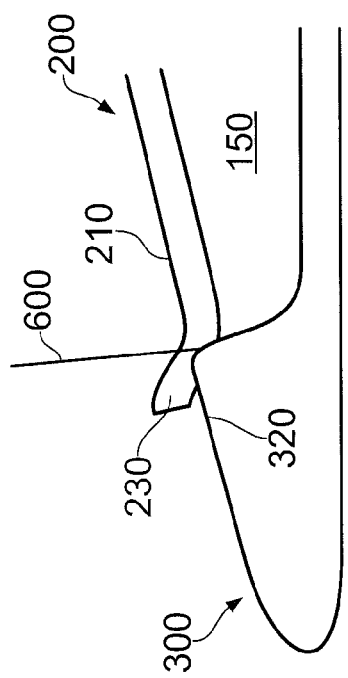

The capping panel 200 and the pocketed aerofoil body 300 are then joined together, for example by welding, for example using an energy beam 600 as shown in FIG. 11c. As a result of the joining process at least a part of the support tab 230 may be removed. Part of the support tab 230 and/or the original surrounding surface 320 of the pocketed aerofoil body 200 on which the support tab was located may result in an unwanted ridge 218 or other feature that needs to be removed, as shown in FIG. 11d. Accordingly, a subsequent finished operation may be employed (in any example of the invention) in order to produce the finished hollow aerofoil 100.

It will be appreciated that use of suction 430 and tabs 230 are only examples of how the capping panel could be located in the capping position by positioning its outer surface 210 relative to the pocketed aerofoil body 300.

Figure 5:
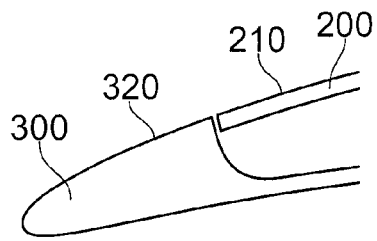
FIG. 5 is a schematic cross section showing a possible arrangement of the capping panel and pocketed aerofoil body prior to the two parts being joined together.
Figure 6:
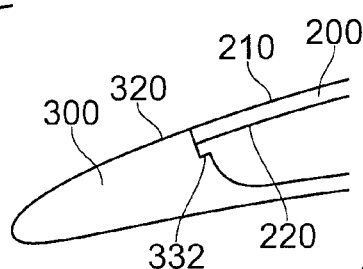
FIG. 6 is a schematic cross section showing another possible arrangement of the capping panel and pocketed aerofoil body prior to the two parts being joined together.
Figure 7:
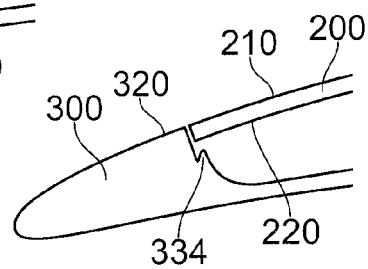
FIG. 7 is a schematic cross section showing another possible arrangement of the capping panel and pocketed aerofoil body prior to the two parts being joined together.

Each of FIGS. 5, 6 and 7 shows an example of an arrangement of capping panel 200 and pocketed aerofoil body 300 prior to joining. In the example of FIG. 5, the capping panel 200 simply abuts the pocketed aerofoil body 300. The arrangements of FIGS. 6 and 7 both include an anti-spatter feature 332/334. These anti-spatter features 332/334 may be formed, for example machined, in the pocket 310. The purpose of the anti-spatter features is to reduce, or substantially eliminate, the extent of any material being ejected—or spattered—into the pocket 310/cavity 150 during welding, as this can have an undesirable impact.

In the example of FIG. 6, the anti-spatter feature is a simple ledge 332 running around the inside of the pocket 310, underneath the capping panel 200 (i.e. facing the inner surface 220 of the capping panel 200. The distance between the inner surface 220 of the capping panel 200 and the ledge 332 may be sufficiently small so as to prevent spatter. For example, the gap may be less than 2 mm, for example less than 1 mm, for example around 0.5 mm to 0.6 mm.

In the example of FIG. 7, the anti-spatter feature 334 takes the form of a gutter, but its function is substantially the same as the ledge 332 described in relation to FIG. 6. Indeed, the anti-spatter feature 334 of FIG. 7 may also be described as a ledge.

Although the gap between the anti-spatter features 332/334 and the surface 220 of the capping panel 200 may be small, it is advantageous to have a finite gap so that the capping panel 200 does not touch, or sit on, the anti-spatter feature 332/334 when it is located in the capping position, for example during welding. In this way, the outer surface 210 of the capping panel 200 can be used to locate/position the capping panel 200, rather than the anti-spatter features 332/334 being used at least in part to locate the capping panel 200, thereby ensuring that the outer surface 220 is located accurately relative to the pocketed aerofoil body 300.

Any anti-spatter features, of which those shown in FIGS. 6 and 7 are only examples, may be consumed during a welding process used to join the capping panel 200 to the pocketed aerofoil body 300.

Figure 8:
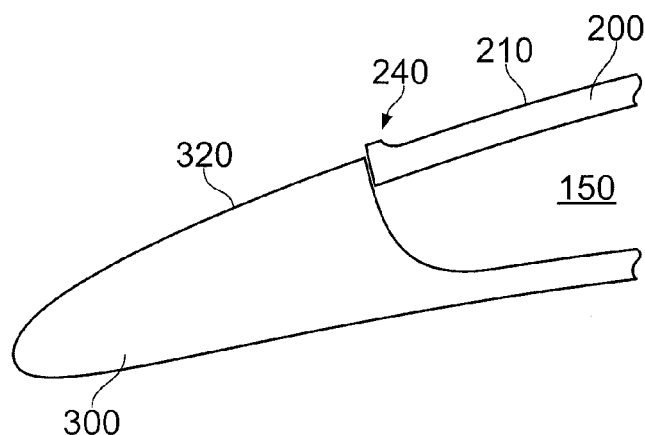
FIG. 8 is a schematic cross section showing a capping panel with a consumable lip.
Figure 10:
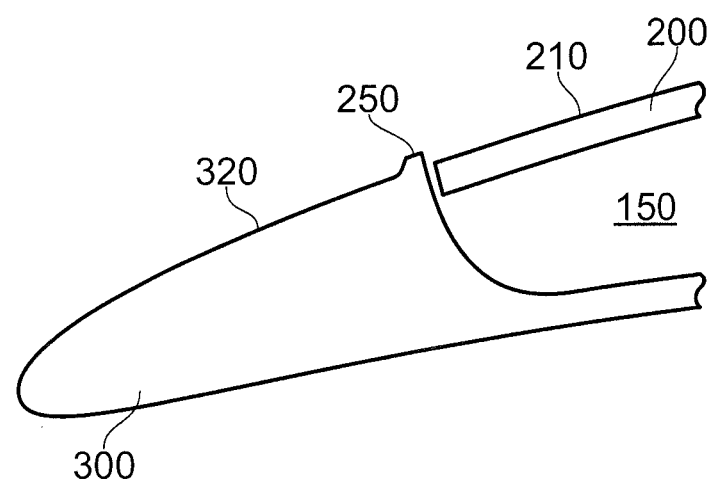
FIG. 10 is a schematic cross section showing a pocketed aerofoil body with a consumable lip.

FIG. 8 shows a capping panel 200 that is provided with a consumable lip 240. A consumable lip 240 such as that shown by way of example in FIG. 8 may or may not be provided to a capping panel 200. As an alternative option, a consumable lip 250 such as that shown in FIG. 10 may (or may not) be provided to the pocketed aerofoil body 300. Such a consumable lip 240 may provide additional material for a weld, should it be required. After the weld, a weld bead may be formed. Such a weld bead may protrude from the surface of the component, and may be removed after welding in a finishing process.

Figure 9:
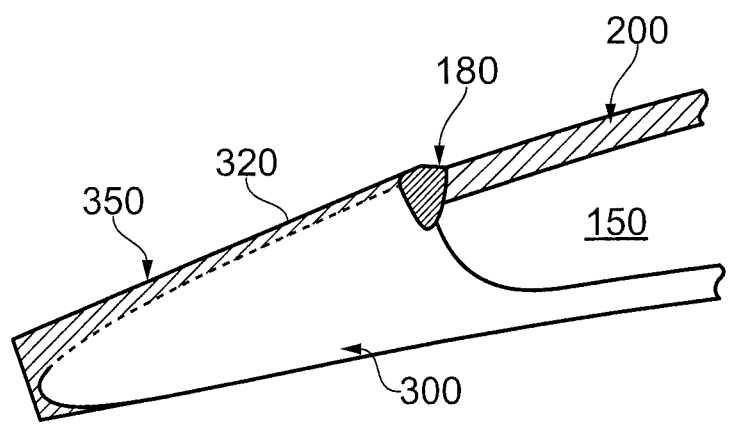
FIG. 9 is a schematic cross section showing an example of a capping panel and a pocketed aerofoil body after the two parts have been joined together.

FIG. 9 shows such a weld bead 180 that would require removing in a finishing operation in order to produce the finished hollow OGV 100. Such a finishing operation may involve machining, for example adaptive machining.

The example shown in FIG. 9 also has excess material 350 on the pocketed aerofoil body 300. Again, this excess material (which may not be present in some examples) would be removed during a finishing operation in order to produce the finished OGV 100. In examples having excess material 350 on the pocketed aerofoil body 300, the capping panel 200 may still be positioned relative to the pocketed aerofoil body 300 (for example the surrounding hollowed surface 320 thereof) using its outer surface 210 as described by way of example only elsewhere herein. In such cases, at least some of the surrounding hollowed surface 320 may be removed (for example machined) in a finishing operation. The excess material 350 may allow the surrounding hollowed surface to be machined back so as to be a smooth continuation of the outer surface 210 of the capping panel 200, for example even in the event of the capping panel 200 being positioned at the extreme end of the allowable tolerance.

Although the invention has largely been described herein in relation to an OGV 100, it will be appreciated that it could be applied to any aerofoil or aerofoil component, such as any rotor blade or stator vane, for example for use in a turbine, compressor, or other aerofoil-shaped component of a gas turbine engine It will be appreciated that many designs and/or arrangements of features, such as capping panel, pocketed aerofoil body or fixture, other than those shown in and described in relation to FIGS. 1 to 9 and not explicitly described herein fall within the scope of the invention. Furthermore, any feature described and/or claimed herein may combined with any other compatible feature described in relation to the same or another embodiment.

We claim:

1. A method of manufacturing a hollow aerofoil using a capping panel and a pocketed aerofoil body, the capping panel having an inner surface and an opposing outer surface, and the pocketed aerofoil body having an open pocket formed in a surrounding hollowed surface that becomes a gas-washed surface of the finished hollow aerofoil, the method comprising:
   forming the capping panel to comprise a support tab extending around at least a part of a perimeter of the capping panel;
   locating the capping panel in a capping position relative to the pocketed aerofoil body, such that (i) the support tab engages the surrounding hollowed surface of the pocketed aerofoil body so as to sit on top of and extend beyond the surrounding hollowed surface, (ii) the capping panel is located in the capping position without the inner surface of the capping panel being either contacted or supported by the pocketed aerofoil body, and (iii) the position of the capping panel is determined by the surrounding hollowed surface of the pocketed aerofoil body;
   joining the capping panel to the pocketed aerofoil body so that the capping panel closes the pocket to form a cavity; and
   removing a ridge formed by the support tab in the joining step.

2. A method of manufacturing a hollow aerofoil according to claim 1, further comprising holding the capping panel in the capping position using the outer surface.

3. A method of manufacturing a hollow aerofoil according to claim 1, wherein after the joining step, the outer surface of the capping panel is continuous with the hollowed surface of the pocketed aerofoil body.

4. A method of manufacturing a hollow aerofoil according to claim 1, comprising applying suction to the outer surface of the capping panel to hold the capping panel before the capping panel is fully joined to the pocketed aerofoil body.

5. A method of manufacturing a hollow aerofoil according to claim 1, further comprising aligning and fixing the outer surface of the capping panel in a capping fixture.

6. A method of manufacturing a hollow aerofoil according to claim 5, further comprising:
   moving the capping fixture, with the capping panel aligned and fixed therein, relative to the pocketed aerofoil body so as to locate the capping panel in the capping position.

7. A method of manufacturing a hollow aerofoil according to claim 5, wherein the capping fixture comprises a reference marker, the method further comprising:
   aligning and fixing the pocketed aerofoil body in a body fixture, the body fixture having a reference marker; and
   moving the capping fixture relative to the body fixture so as to align the respective reference markers and thereby locate the capping panel in the capping position.

8. A method of manufacturing a hollow aerofoil according to claim 1, wherein the joining step comprises use of a welding beam in the form of electron beam welding or laser welding.

9. A method of manufacturing a hollow aerofoil according to claim 8, wherein the welding beam is inclined at an angle ($\theta$) relative to the perpendicular to the surface being welded, so as to be directed away from the pocket and into the material forming the pocketed aerofoil body.

10. A method of manufacturing a hollow aerofoil according to claim 1, wherein:
    the joining step comprises welding; and
    the pocketed aerofoil body comprises an anti-spatter feature in the pocket arranged to reduce spatter caused by the welding process.

11. A method of manufacturing a hollow aerofoil according to claim 10, wherein the anti-spatter feature comprises a ledge located inside the pocket and positioned such that, when the capping panel is in the capping position, the ledge faces the inner surface of the capping panel and there is a gap between the ledge and the capping panel.

12. A method of manufacturing a hollowed aerofoil according to claim 1, further comprising machining the pocket into an aerofoil blank in order to produce the pocketed aerofoil body cavity.

13. A method of manufacturing a hollow aerofoil according to claim 1, wherein:
   the step of forming the capping panel comprises machining a recess into the capping panel so as to form an engaging face; and
   the step of locating the capping panel in the capping position comprises engaging the engaging face with the surrounding hollowed surface.

* * * * *